United States Patent
Ito

(10) Patent No.: US 7,174,537 B2
(45) Date of Patent: *Feb. 6, 2007

(54) MICROCOMPUTER CONTROL SYSTEM IN WHICH PROGRAMS CAN BE MODIFIED AND NEWER VERSIONS OF THE MODIFIED PROGRAMS BEING DETECTED AND EXECUTED

(75) Inventor: Tamotsu Ito, Ayase (JP)

(73) Assignee: Hitachi, Ltd., Tokyo (JP)

( * ) Notice: Subject to any disclaimer, the term of this patent is extended or adjusted under 35 U.S.C. 154(b) by 611 days.

This patent is subject to a terminal disclaimer.

(21) Appl. No.: 10/268,721

(22) Filed: Oct. 11, 2002

(65) Prior Publication Data

US 2003/0033598 A1 Feb. 13, 2003

Related U.S. Application Data

(63) Continuation of application No. 09/308,578, filed on May 21, 1999, now Pat. No. 6,496,978, which is a continuation of application No. PCT/JP97/03338, filed on Sep. 9, 1997.

(30) Foreign Application Priority Data

Nov. 29, 1996 (JP) .................................. P8-319558

(51) Int. Cl.
 *G06F 9/44* (2006.01)
(52) U.S. Cl. .................... 717/110; 717/106; 717/126
(58) Field of Classification Search ........ 717/169–171; 713/191
See application file for complete search history.

(56) References Cited

U.S. PATENT DOCUMENTS

| | | | | |
|---|---|---|---|---|
| 5,359,730 A | * | 10/1994 | Marron | 717/169 |
| 5,473,540 A | | 12/1995 | Schmitz | 701/1 |
| 5,732,275 A | * | 3/1998 | Kullick et al. | 717/170 |
| 5,771,348 A | | 6/1998 | Kubatzki et al. | 713/200 |
| 5,828,888 A | | 10/1998 | Kozaki et al. | 717/170 |
| 5,878,256 A | | 3/1999 | Bealkowski et al. | 713/2 |
| 5,881,292 A | | 3/1999 | Sigal et al. | 717/170 |
| 5,930,504 A | | 7/1999 | Gabel | 713/2 |
| 6,006,034 A | | 12/1999 | Heath et al. | 717/170 |
| 6,067,500 A | | 5/2000 | Morimoto et al. | 701/209 |
| 6,496,978 B1 | * | 12/2002 | Ito | 717/170 |
| 2004/0003266 A1 | * | 1/2004 | Moshir et al. | 713/191 |

FOREIGN PATENT DOCUMENTS

| | | |
|---|---|---|
| JP | 4242430 | 8/1992 |
| JP | 5233267 | 9/1993 |
| JP | 6314190 | 11/1994 |
| JP | 7248914 | 9/1995 |
| JP | 7319684 | 12/1995 |
| JP | 8272601 | 10/1996 |

* cited by examiner

*Primary Examiner*—Kakali Chaki
*Assistant Examiner*—Mark P. Francis
(74) *Attorney, Agent, or Firm*—Mattingly, Stanger, Malur & Brundidge, P.C.

(57) ABSTRACT

Programs or data in a mask ROM incorporated in a one-chip microcomputer can be modified from the outside. With version information appended to each of a mask ROM 2 incorporated in a one-chip microcomputer 6 and an external EPROM 5, by comparing the version numbers, programs (tasks and subroutines) of a new version can always be executed and update data of a new version can be used. The programs can be customized for each user.

7 Claims, 16 Drawing Sheets

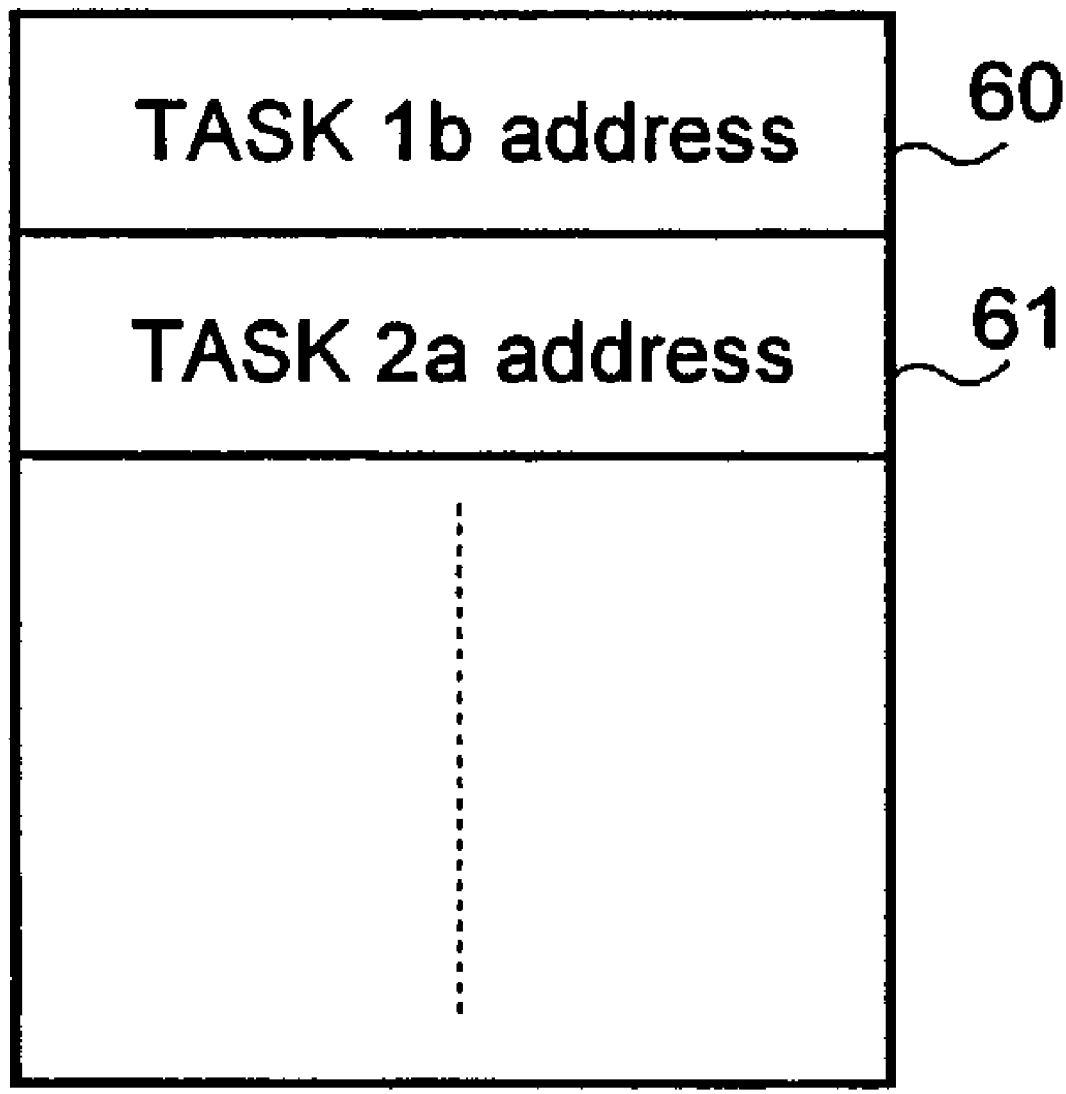

MICROCOMPUTER CONTROL SYSTEM IN WHICH PROGRAMS CAN BE MODIFIED AND NEWER VERSIONS OF THE MODIFIED PROGRAMS BEING DETECTED AND EXECUTED

The present application is a continuation of application Ser. No. 09/308,578, filed May 21, 1999 now U.S. Pat. No. 6,496,978 which is a continuation of under 371 of PCT/JP97/03338, filed Sep. 9, 1997, the contents of which are incorporated herein by reference.

BACKGROUND OF THE INVENTION

The present invention relates to a microcomputer control system which is controlled on the basis of programs or data stored in memory. A control system in which an incorporated ROM can be modified in a pseudo manner is described in e.g., Japanese Published Unexamined Patent Application No. Hei 7-182153.

The control device comprises a ROM storing a control program for effecting a control procedure and a processing unit that executes the control program to control the device, and further includes a loadable and unloadable nonvolatile memory storing a replacement program to replace part of the control program and replacement specification information indicating whether to carry out the replacement, whereby the control program executes the replacement program in accordance with the replacement specification information. As a result, the program can be modified without replacing the original program ROM.

Although the above-described control device enables program modifications to be made without replacing an original program ROM, since the modifications are determined by replacement specification information stored in a nonvolatile memory, for example, when part of a control program in the original program ROM is modified to newly create an upgraded control unit and a nonvolatile memory is used therein, if the modified portion is replacement specification information, in the nonvolatile memory, for directing replacement with the replacement program, the modified portion would not be used. To prevent this requires an additional nonvolatile memory for the replacement program, provided for modifications to the control program of the program ROM.

As described above, the above-described control device has given no consideration to independent modifications between a control program in an incorporated RON and an external replacement program.

SUMMARY OF THE INVENTION

An object of the present invention is to provide a microcomputer control system which enables independent modifications between a control program or data in an incorporated memory and a replacement program or data in an external memory.

To achieve the above object, the present invention appends version information to a control program or data in an incorporated memory and to a replacement program or data in an external memory, and determines from the version information whether to use the control program or data in the incorporated memory, or the replacement program or data in the external memory.

Without being limited to the version information, the above object of the present invention is achieved by comparing a plurality of programs or pieces of data to determine required programs or data, and based on the results, using internal or external programs or data.

BRIEF DESCRIPTION OF THE DRAWINGS

FIG. 6 is a diagram which shows a concrete example of the contents of information stored in the RAM of FIG. 1 in another embodiment of a microcomputer control system according to the present invention.

DETAIL DESCRIPTION OF THE INVENTION

Hereinafter, various embodiments of the present invention will be described with reference to the accompanying drawings.

Figure 1:
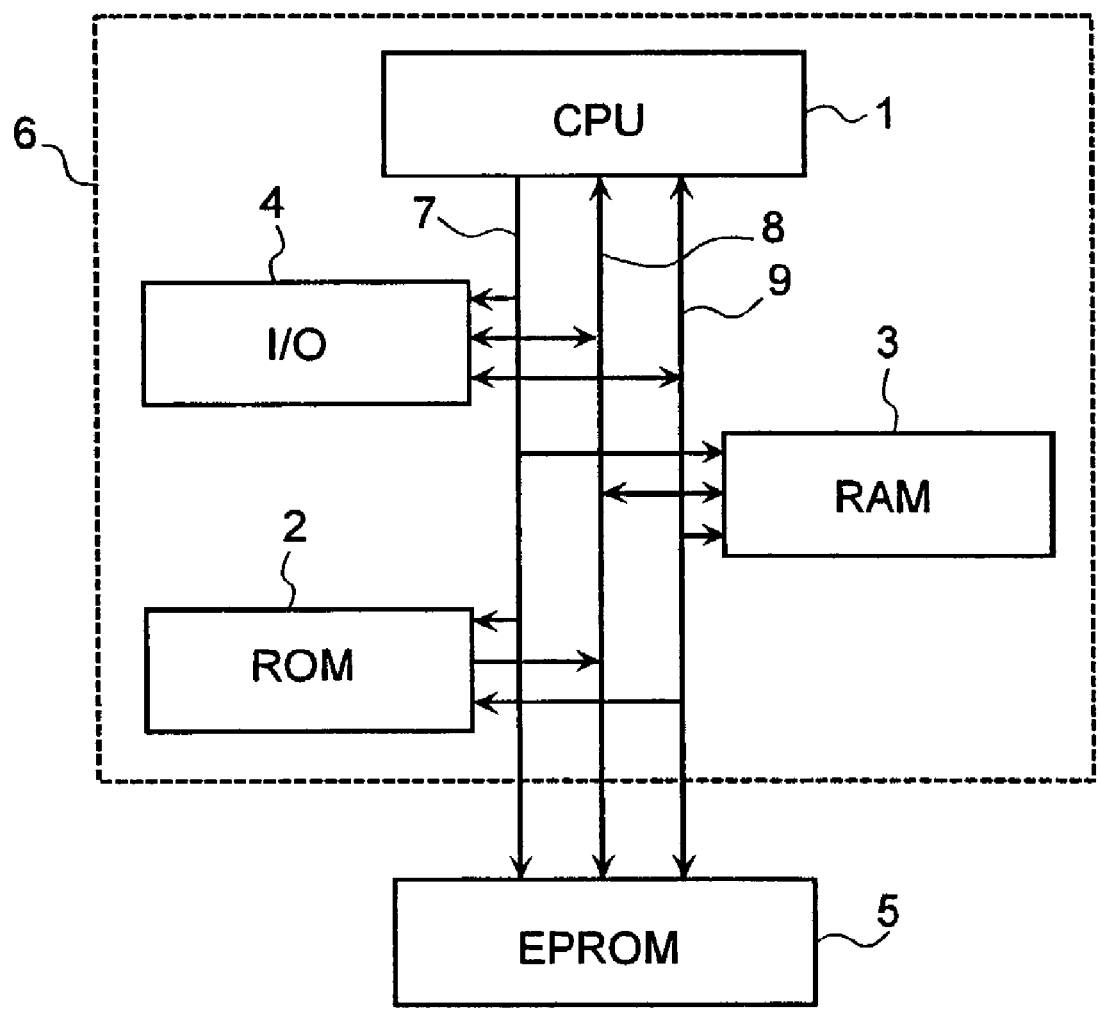
FIG. 1 is a block diagram showing an embodiment of a microcomputer system according to the present invention.

FIG. 1 is a block diagram showing an embodiment of a microcomputer control system according to the present invention. In FIG. 1, a one-chip microcomputer 6 includes a CPU (central processing unit) 1, ROM (read only memory) 2, RAM (random access memory) 3, I/O (input/output) unit 4, and is connected to an EPROM (erasable programmable ROM) 5 by way of address bus 7, data bus 8, and control bus 9.

In FIG. 1, this embodiment comprises a one-chip microcomputer 6 in which CPU 1, ROM 2, RAM 3, and I/O unit 4 are formed in one identical chip, and an external EPROM 5 connected to them by address bus 7, data bus 8, and control bus 9. The CPU 1 controls the entire system, and a procedure (program) for running the CPU 1 and data are stored in the ROM 2. The ROM 2 is a memory which is not erasable from the outside and the RAM 3 is an erasable memory used to save data and the like. The I/O unit 4 is used to input and output data to and from the outside. In the EPROM 5 there are stored a program and data which are used to equivalently replace a program and data stored in the ROM 2, which is not erasable from the outside.

The CPU 1 is, within the above chip, linked with the ROM 2, RAM 3, I/O part 4, and EPROM 5 via the address bus 7, which denotes an address signal group, the data bus 8, which denotes an input/output data signal group of the CPU 1, and the control bus 9, which denotes a control signal group, such as read and write signals.

Figure 2A:
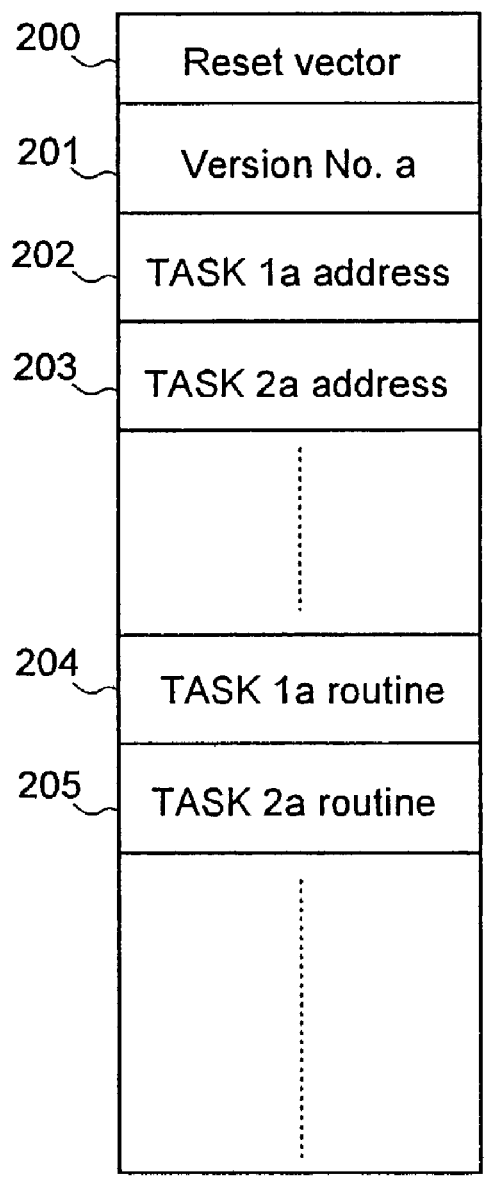
FIGS. 2(a) and 2(b) are labels which show the contents of information stored in the ROM and EPROM of FIG. 1, respectively.
Figure 2B:
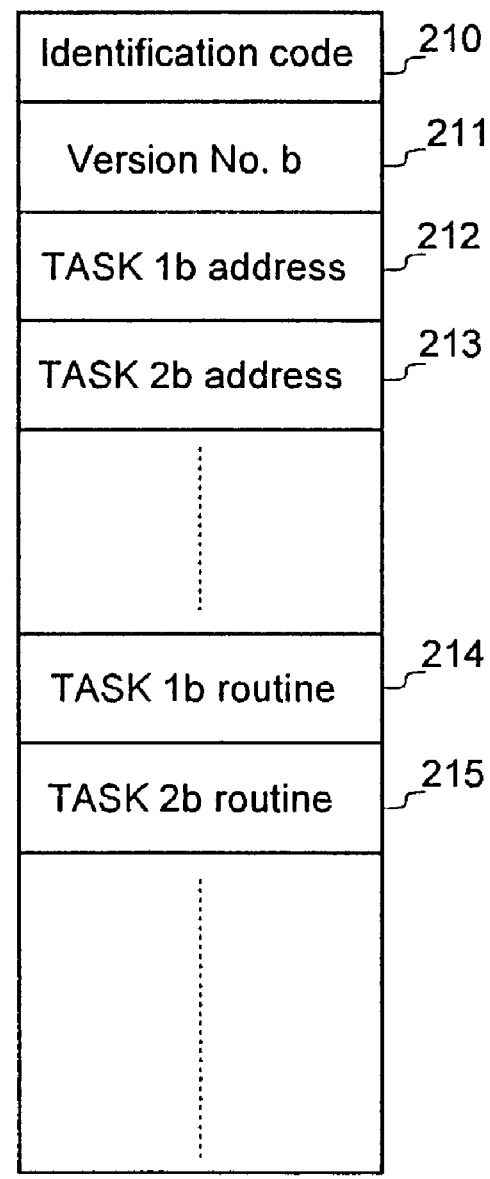

FIG. 2(a) shows the contents of information stored in the ROM 2, and FIG. 2(b) shows the contents of information stored in the EPRON 5.

In FIG. 2(a), in the ROM 2, a reset vector and version information of a version number a are stored in storage areas 200 and 201 in an address space, respectively, TASK1a and TASK2a addresses are stored in storage areas 202 and 203, respectively, and TASK1a and TASK2a routines are stored in storage areas 204 and 205, respectively, corresponding to the TASK1a and TASK2a addresses.

In FIG. 2(b), in the EPROM 5, identification information (identification code) and version information of a version number b are stored in storage areas 210 and 211, respectively, TASK1b and TASK2b addresses are stored in storage areas 212 and 213, respectively, and TASK1b and TASK2b routines are stored in storage areas 214 and 215, respectively, corresponding to the TASK1b and TASK2b addresses.

Figure 3:
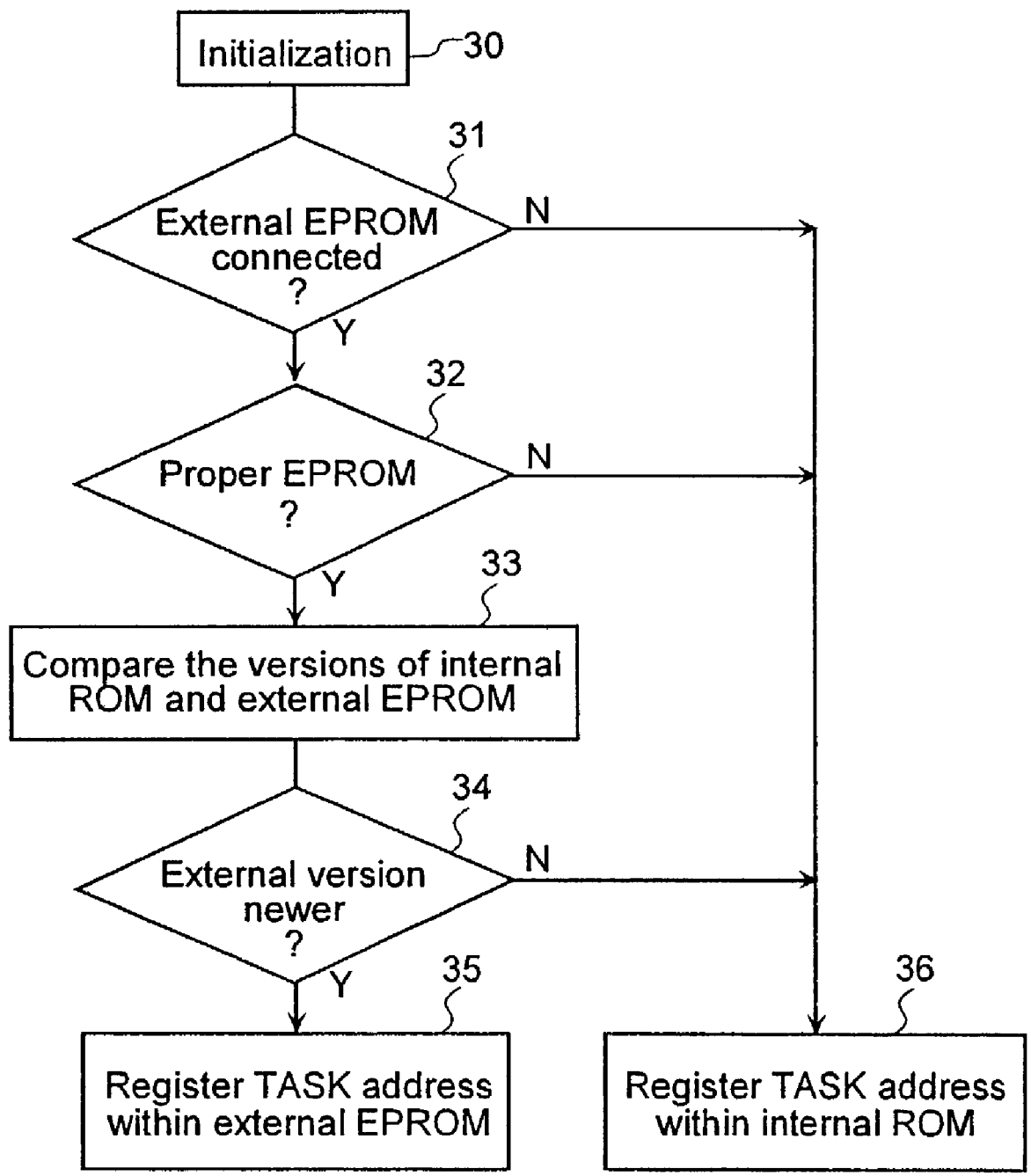
FIG. 3 is a flowchart showing how an embodiment of a microcomputer control system according to the present invention operates using the information contents shown in FIGS. 2(a) and 2(b) at power on or reset.

FIG. 3 is a flowchart showing the operation of this embodiment at power on or reset. Hereinafter, the processing procedure will be described with reference to FIGS. 2 and 3.

At power on or reset, the CPU 1 issues an address to specify the storage area 200 in which a reset vector of ROM 2 is stored; reads the information (namely, a reset vector) from the storage area 200, and transfers control to the reset vector (a starting address at which the first program to be operated is stored).

The first program to be executed at power on or reset initializes the internal registers of the CPU 1, sets initial conditions of the I/O unit 4, internally initializes the RAM 3, and performs other initializations (step 30).

Next, it is judged whether the EPROM 5 is connected to the outside (step 31). To be more specific, the storage area of the EPROM 5 is read to check for the existence of data. If the EPROM 5 is not connected to the outside, control is transferred to step 36; if the EPROM 5 is connected to the outside, it is judged whether the EPROM is the proper EPROM conforming to a microcomputer control system of the embodiment (step 32). This is judged by accessing identification information (identification code) (e.g., a hash value or the like generated from, e.g., character code "ΔΔΔΔ" and data and program code within the EPROM 5) stored in advance in a predetermined storage area (storage area 210 in this example) of the EPROM 5 and checking to see whether the identification information (identification code) is appropriate. If the EPROM 5 is an EPROM conforming to the microcomputer control system, control is transferred to step 36.

When the EPROM 5 is an EPROM conforming to the microcomputer control system, version information (version number a) stored in the storage area 201 of the ROM 2 is compared with version information (version number b) stored in the storage area 211 of the EPROM 5 (step 33), and if the comparison shows that the version number b of the EPROM 5 is more recent, control is transferred to step 35; if the version number a of the ROM 2 is more recent, control is transferred to step 36 (step 34).

Figure 4:
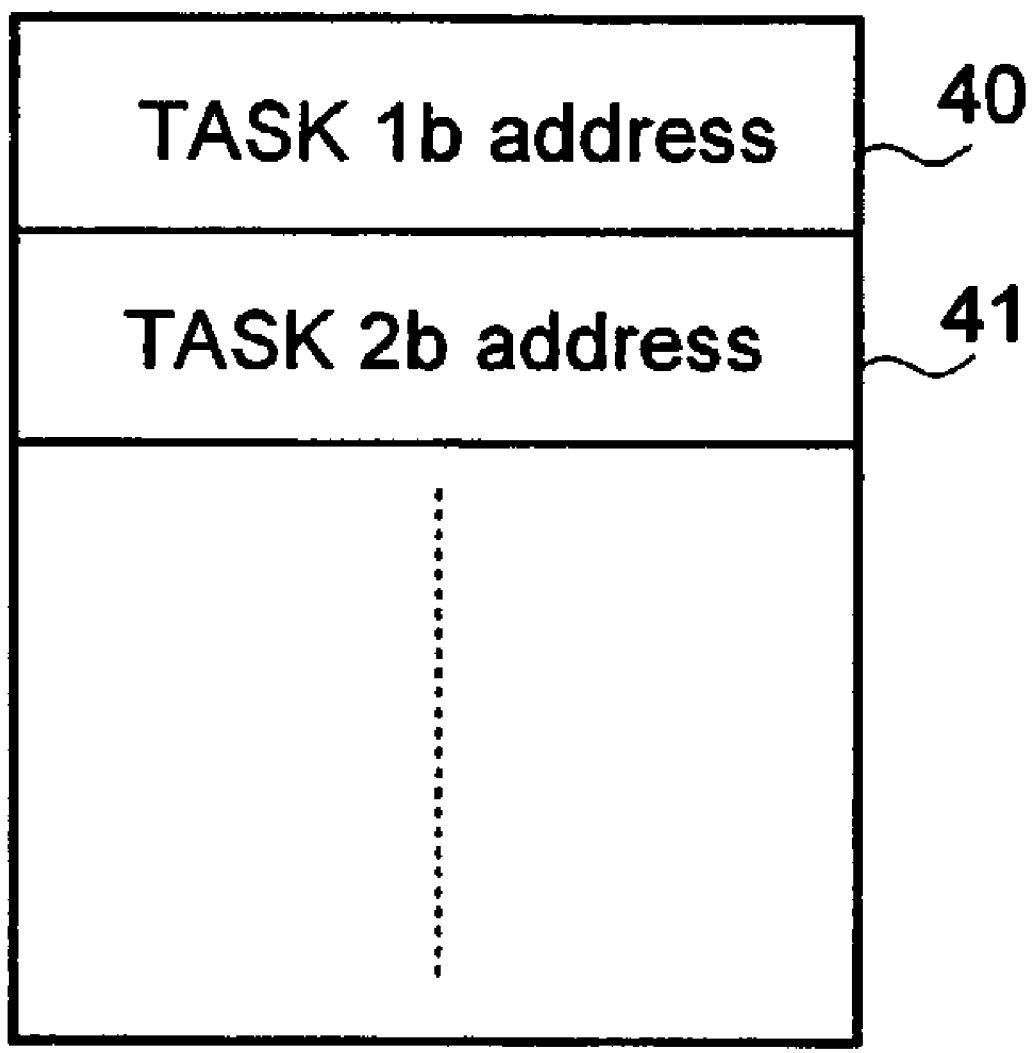
FIG. 4 is a diagram which shows a concrete example of the contents of information stored in the RAM of FIG. 1 as a result of the operation shown in FIG. 3.

In step 35, the task addresses (in this example, TASK1b in storage area 212 and TASK2b address in storage area 213) stored in the EPROM 5 are registered in RAM 3. FIG. 4 shows the contents registered in the RAM 3. In this example, since the addresses of tasks stored in the EPROM 5 are registered in the RAM 3, TASK1b and TASK2b addresses are registered in e.g., storage areas 40 and 41, respectively.

In step 36, the task addresses (in this example, TASK1a in storage area 202 and TASK2a address in storage area 203) stored in the ROM 2 are registered in RAM 3. In this case, the task addresses registered in the RAM 3 are different from those shown in FIG. 4; for example, TASK1a and TASK2a addresses are registered in storage areas 40 and 41, respectively.

Tasks registered in the EPROM 5 or the ROM 2 are read using the task addresses registered in the RAM 3. If the task addresses registered in the RAM 3 are the TASK1b and TASK2b addresses in the EPROM 5 as shown in FIG. 4, TASK1 executes a TASK1b routine stored in storage area 214 of the EPROM 5 and TASK2 executes a TASK2b routine stored in storage area 215 of the EPROM 5. In this case, the programs and data stored in the EPROM 5 are executed in place of the programs and data stored in the ROM 2.

Conversely, if task addresses registered in the RAM 3 are the TASK1a and TASK2a addresses in the ROM 2, TASK1 executes a TASK1a routine stored in storage area 204 of the ROM 2 and TASK2 executes a TASK2a routine stored in storage area 205 of the ROM 2. In this case, the programs and data stored in the ROM 2 are preferentially used.

Each time the programs and data stored in the ROM 2 are modified to develop an upgraded microcomputer control system, the version number a of the programs and data is updated. Therefore, even if an external EPROM 5 is used in a microcomputer control system incorporating the ROM 2 storing unmodified programs and data, if the version number a is newer than the version number b of the EPROM 5, the modified programs and data will be used. Of course, if the programs and data of external EPROM 5 are modified and the version number b thereof is newer than the version number a of programs and data in the ROM 2, the programs and data of the EPROM 5 are used. In this way, any combination of the version number a of the ROM 2 and the version number b of the EPROM 5 becomes possible and the programs and data of the ROM 2 can be modified independent of those of the EPROM 5, and regardless of such a modification, the programs and data of the ROM 2 and those of the EPROM 5 are organically linked and used.

The version number a of programs and data in the RON 2 increases to indicate a newer version in the unit of a certain block, such as 100, 200, 300, and so forth, and the version number b increases with more detailed values, such as 101, 213, 365, and so forth. This always yields a difference between the version numbers a and b, so that which of the versions is newer or older can be determined from the values of the version numbers. Should the version numbers match, the programs and data of the RON 2 could be used without trouble.

In the embodiment of FIGS. 2(a) and 2(b), it would be more effective in terms of system configuration if each of the storage areas 200, 201, 202, 203, 210, 211, 212, and 213 has a fixed address, which is a fixed absolute value of address in an absolute address space. However, the embodiment of the present invention is not limited to only fixed addresses.

Figure 5A:
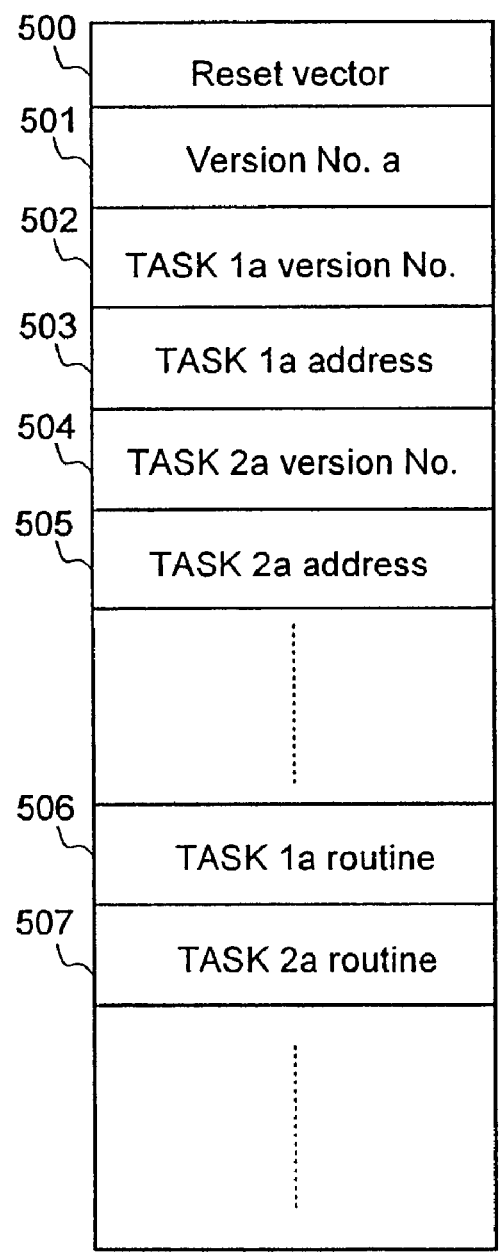
FIGS. 5(a) and 5(b) are diagrams showing the contents of information stored in the ROM and EPROM of FIG. 1, respectively, in another embodiment of a microcomputer control system according to the present invention.
Figure 5B:
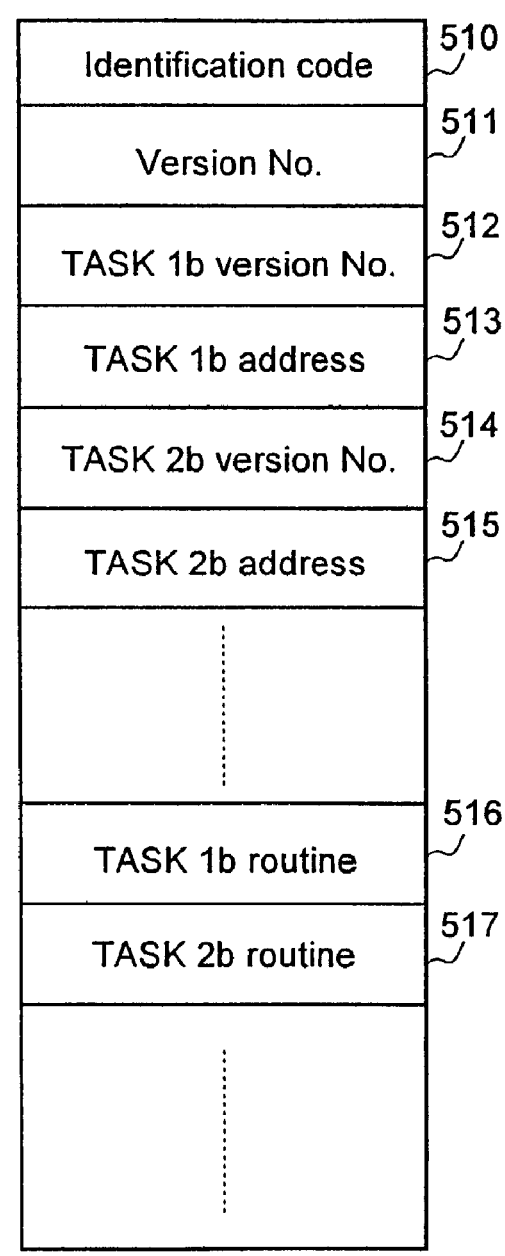

FIG. 5(a) shows the contents of information stored in ROM 2 in a one-chip microcomputer 6 respectively another embodiment of a microcomputer control system according to the present invention, and FIG. 5(b) shows the contents of information stored in external EPROM 5 in the one-chip microcomputer 6. The hardware configuration of this embodiment is also the same as that shown in FIG. 1.

In FIG. 5(a), in ROM 2, a reset vector and a version number a are stored in storage areas 500 and 501, respectively; in storage area 502 and the following areas, task addresses are stored together with a version number; and task routines corresponding to the task addresses are stored in storage area 506 and the following areas. In this embodiment, TASK1a and TASK2a addresses are used as task addresses, and TASK1a and TASK2a routines corresponding thereto are also stored. Further, a TASK1a address is stored in storage area 503, a TASK1a version number corresponding thereto is stored in storage area 502, a TASK2a address is stored in storage area 505, and a TASK2a version number corresponding to thereto is stored in storage area 504.

In FIG. 5(b), in EPROM 5, an identification code and a version number bare stored in storage areas 510 and 511, respectively; in storage area 512 and the following areas, task addresses are stored together with a version number; and task routines corresponding to the task addresses are stored in storage area 516 and the following areas. In this embodiment, TASK1b and TASK2b addresses are used as task addresses, and TASK1b and TASK2b routines corresponding thereto are also Stored. Further, a TASK1b address is stored in storage area 513, a TASK1b version number corresponding thereto is stored in storage area 512, a TASK2b address is stored in storage area 515, and a TASK2b version number corresponding to thereto is stored in storage area 514.

Also, in this embodiment, all programs and data are stored in the above format in each of the ROM 2 and EPROM 5. In the embodiment shown in FIGS. 2(a) and 2(b), programs and data of either of the ROM 2 and EPROM 5 are used by comparing the version numbers a and b and the whole programs and data are replaced, while in the embodiment shown in FIGS. 5(a) and 5(b), programs and data stored in the RON 2 are provided with a version number for each task address as described above, whereby they can be replaced by programs and data stored in the EPROM 5 partially (that is, on a routine basis). Accordingly, TASK1b and TASK2b routines in the EPROM 5 can replace TASK1a and TASK2a routines in the ROM 2, respectively, and to determine such a correspondence, task versions, task addresses, and task routines are stored in the ROM 2 and the EPROM 5.

Although reset vectors, identification codes, and version numbers a and b are the same as those in the embodiment described previously, in this embodiment, when a version number b of EPROM 5 assumes a maximum value (e.g., a hexadecimal number FFFF), like the previous embodiment, all tasks execute task routines within the EPROM 5, and in other cases, an algorithm dictates that version numbers are compared for each task. Accordingly, like the previous embodiment, when the version numbers a and b are compared, a version number a of the ROM 2 can be the above maximum value minus e.g., one (e.g., a hexadecimal number FFFE), or without making such a comparison, the version number b can be read to judge whether it is equal to the above maximum value.

When a version number b of the EPRON is not a maximum value, in FIG. 5(a) and FIG. 5(b), a TASK1a version number stored in storage area 502 of the ROM 2 is compared with a TASK1b version number stored in storage area 512 of the EPROM 5, and a TASK1 address of the newer version number is registered in the RAM 3. If the TASK1a version number is newer, the TASK1a address corresponding thereto is registered in the RAM 3. In this example, assuming that the TASK1b version number of the EPROM 5 is newer, the TASK1b address corresponding thereto is registered in the RAM 3.

Similarly, a TASK2a version number stored in storage area 504 of the ROM 2 is compared with a TASK2b version number stored in storage area 514 of the EPROM 5, and a TASK1 address of the newer version number is registered in the RAM 3. If the TASK2b version number is newer, the TASK2b address corresponding thereto is registered in the RAM 3. In this example, assuming that the TASK2a version number of the ROM 2 is newer, the TASK2a address corresponding thereto is registered in the RAM 3.

As a result, as shown in FIG. 6, in the RAM 3, the TASK1b address of the EPROM 5 and the TASK2a address of the ROM 2 are stored in storage area 60 as a TASK1 address and in storage area 61 as a TASK2 address, respectively. Accordingly, TASK1 and TASK 2 execute the TASK1b routine of the EPROM 5 and the TASK2a routine of the ROM 2, respectively.

Of course, if the TASK1a address of the ROM 2 and the TASK2b address of the EPROM 5 are registered, the TASK1a routine of the ROM 2 and the TASK2b routine of the EPROM 5 will be executed.

This embodiment is also the same as the previous embodiment, in that the programs and data of the ROM 2 can be modified independent of those of the EPROM 5 and regardless of such a modification, the programs and data of the ROM 2 and those of the EPROM 5 are organically linked and used.

In the embodiment of FIGS. 5(a) and 5(b), it would be more effective in terms of system configuration if each of the storage areas 500, 501, 502, 503, 504, 505, 510, 511, 512, 513, 514, and 515 has a fixed address, which is a fixed absolute value of address in an absolute address space. However, the embodiment of the present invention is not limited to only fixed addresses.

Figure 7A:
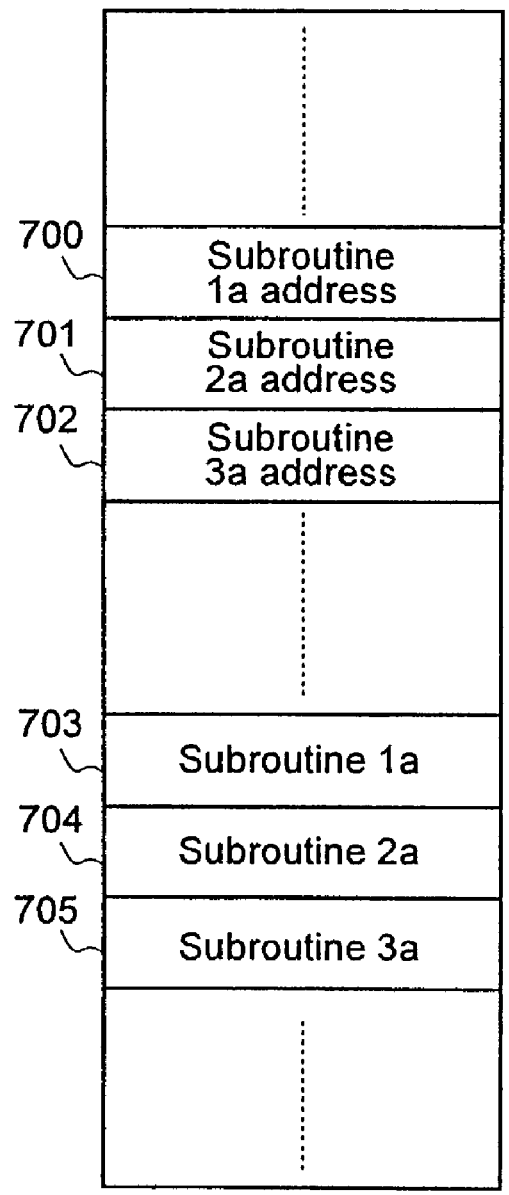
FIGS. 7(a) and 7(b) are diagrams which show the contents of information stored in the ROM and EPROM of FIG. 1, respectively, in still another embodiment of a microcomputer control system according to the present invention.
Figure 7B:
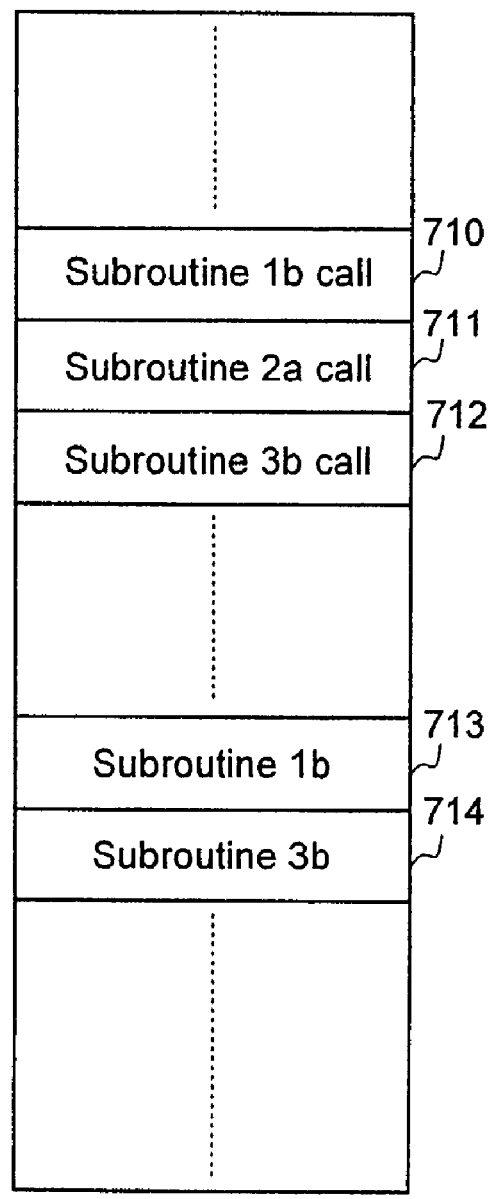

By the way, since the access speed of the ROM 2 of the one-chip microcomputer 6 is generally higher than that of the external EPROM 5, the use of the ROM 2 in the one-chip microcomputer 6 is advantageous to the system. FIGS. 7(a) and 7(b) show, when the ROM 2 in the one-chip microcomputer 6 is used, the contents of information stored in a memory in still another embodiment of a microcomputer control system according to the present invention. FIG. 7(a) shows the contents of information stored in the ROM 2 within the one-chip microcomputer 6 and FIG. 7(b) shows the contents of information stored in the external EPROM 5. Also, in this embodiment, the hardware configuration is the same as that in FIG. 1.

This embodiment, as in the embodiment described with reference to FIGS. 2(a) and 2(b), executes programs and data stored in the ROM 2 or the EPROM 5 in accordance with the result of comparison between version numbers a and b. In this embodiment, if some of the subroutines stored in the EPROM 5 are not subjected to modifications to corresponding subroutines of the ROM 2, when programs and data stored in the EPROM 5 are executed, the subroutines stored in the ROM 2 can also be used.

Accordingly, on the assumption that, in FIGS. 7(a) and 7(b), a processing procedure in the external EPROM 5 dictates execution of subroutines 1, 2, and 3 in that order, the subroutine 2 is unchanged, and a subroutine 2a of the ROM 2 can be used, subroutines 1b and 3b are stored in e.g., storage areas 713 and 714 of EPROM 5, and a subroutine 2a stored in the ROM 2 is used as a subroutine 2b. In storage areas 710 to 712 of the EPROM 5, subroutine call instructions are stored to call these subroutines. Thus, in storage areas 710 and 712, subroutine 1b and subroutine 3b call instructions are stored to call subroutines 1b and 3b stored in the EPROM 5; and in storage area 711, a subroutine 2a call instruction is stored to call a subroutine 2a stored in storage area 704 of the ROM 2.

In this way, by storing subroutine call instructions in the EPROM 5, if the EPROM 5 is newer and programs and data stored therein are used, the subroutines 1b, 2b, and 3b stored in the EPROM 5 are used by the subroutine 1b, 2b, and 3b call instructions stored in the EPROM 5. In the embodiment of FIGS. 7(a) and 7(b), the subroutine 2a of the ROM 2 is executed as a subroutine by the subroutine 2a call instruction.

If the external EPROM 5 is newer, no special arrangement is necessary because the subroutine addresses of the ROM 2 are already known. However, it goes without saying that it is more desirable to store the addresses of subroutines 1a, 2a, and 3a in the ROM 2 as subroutine 1a, 2a, and 3a addresses, as in this embodiment.

As described above, in this embodiment, like the previous embodiments, the programs and data of the ROM 2 can be modified independent of those of the EPROM 5, and these can be organically liked and used. Moreover, since only modified portions of programs and data of the ROM 2 have to be stored, the storage capacity can be reduced.

In the embodiment of FIGS. 7(a) and 7(b), it would be more effective in terms of system configuration if each of the storage areas 700, 701, 702 has a fixed address, which is a fixed absolute value of address in an absolute address space. However, the embodiment of the present invention is not limited to only fixed addresses. (The storage areas 710, 711, and 712 need not be fixedly addressed because they are used for programs optionally placed as required.)

Figure 8A:
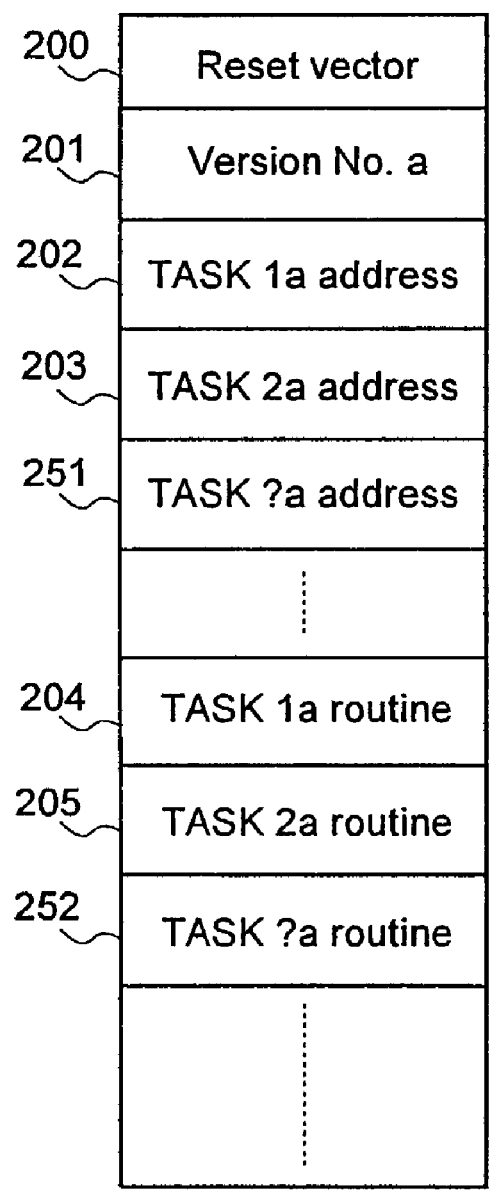
FIGS. 8(a) and 8(b) are diagrams which show the contents of information stored in the ROM and EPROM of FIG. 1, respectively, in still another embodiment of a microcomputer control system according to the present invention.
Figure 8B:
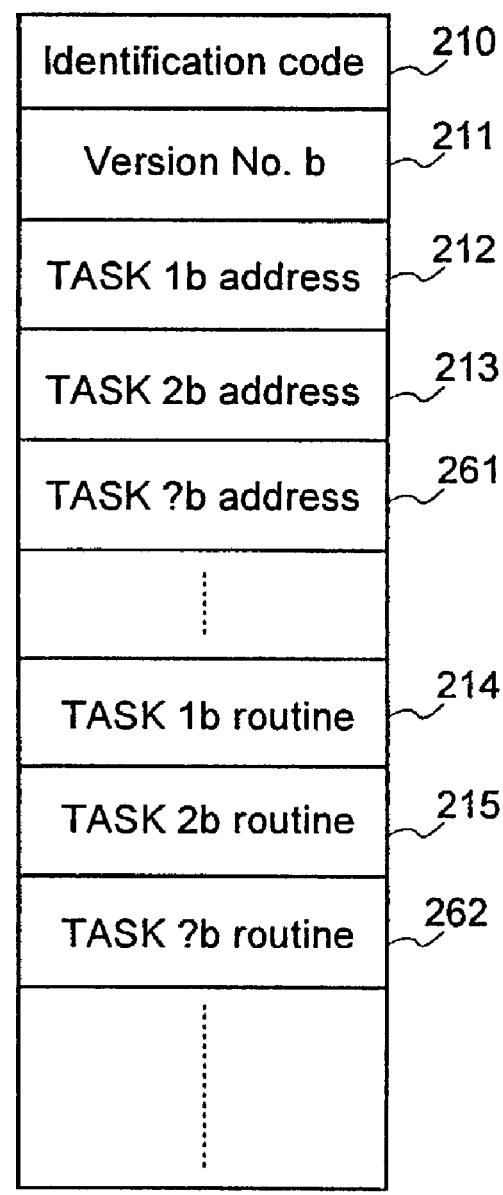

FIGS. 8(a) and 8(b) show an embodiment to which storage areas 251, 252, 261, and 262 are added to the embodiment of FIGS. 2(a) and 2(b).

FIG. 8(a) shows the contents of information stored in the ROM 2 within the one-chip microcomputer 6 representing still another embodiment of a microcomputer control system according to the present invention, and FIG. 8(b) shows the contents of information stored in the external EPROM 5 in the same microcomputer control system. The hardware configuration of this embodiment is also the same as that shown in FIG. 1.

In FIG. 8(a), in the RON 2, a TASK?a address is stored in storage area 251 and a TASK?a routine corresponding to the TASK?a address is stored in storage area 252.

In FIG. 8(b), in the EPROM 5, a TASK?b address is stored in storage area 261 and a TASK?b routine corresponding to the TASK?b address is stored in storage area 262.

The TASK?a routine is a task not having processing substance and the TASK?b routine is a task having processing substance. When the ROM 2 is fabricated, the system is configured so as not to run into trouble depending on the existence or absence of the TASK?a routine, but if the TASK?b routine of the EPROM 5 is added to the system, the TASK?b routine will be newly executed.

Figure 9:
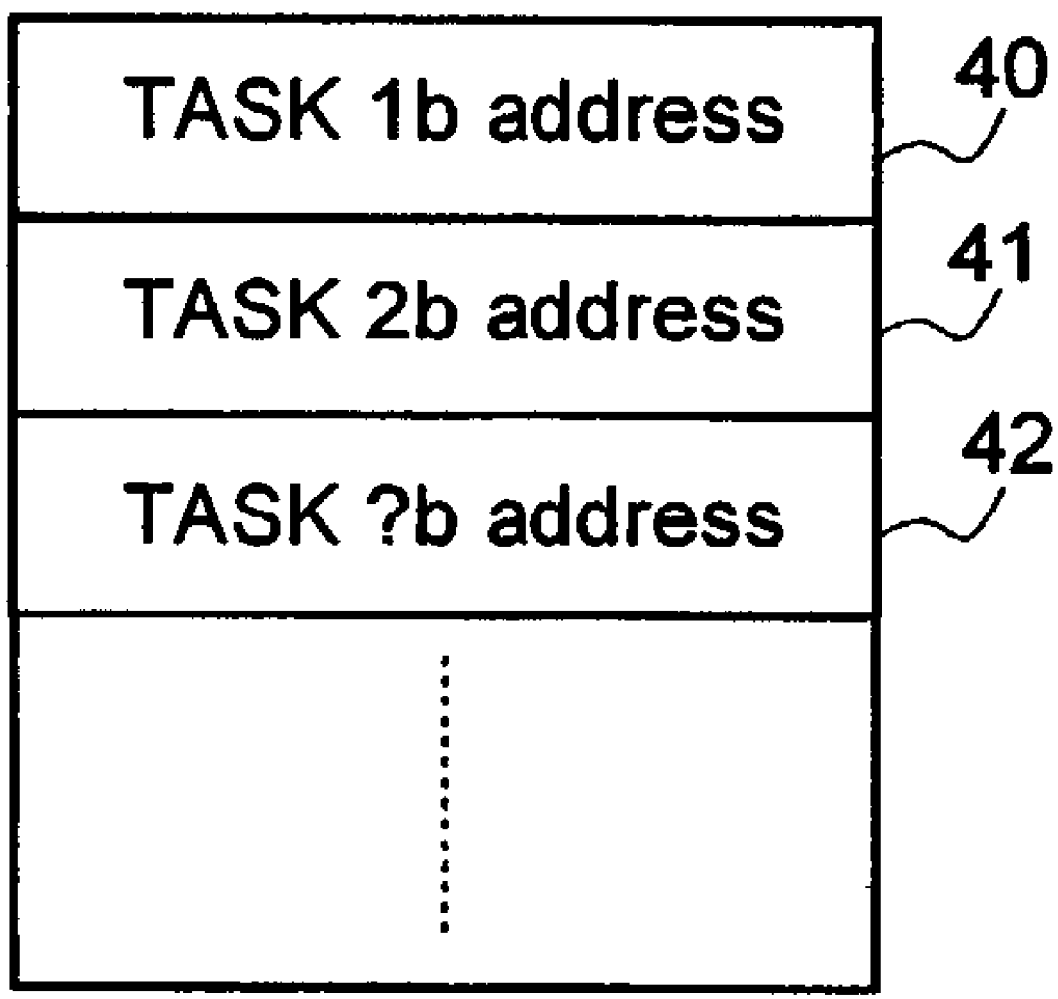
FIG. 9 is a diagram which shows a concrete example of the contents of information stored in the RAM of FIG. 1 in yet another embodiment of a microcomputer control system according to the present invention.

As described above, if the TASK?b routine is added, an address is registered in the RAM 3 as shown in FIG. 9. That is, storage area 42 is added to the embodiment of FIG. 4 and the TASK?b address is registered in the storage area 42.

Of course, if it is unnecessary to newly add processing, the TASK?b routine might be registered as a task not having processing substance. Alternatively, an address (e.g., address 0) which is impossible in the system configuration might be set as a TASK?b address. The setting of an address which is impossible in the system configuration, such as the TASK?b address, although the legality of a task address must be judged each time the task is used, poses no problem in terms of system configuration because, if a set address is e.g., address 0, it can be easily determined whether a set address is 0 or not.

In the embodiment of FIGS. 8(a) and 8(b), it would be more effective in terms of system configuration if each of the storage areas 251 and 261 added to the embodiment of FIG. 2 has a fixed address, which is a fixed absolute value of address in an absolute address space. However, the embodiment of the present invention is not limited to only fixed addresses.

Figure 10A:
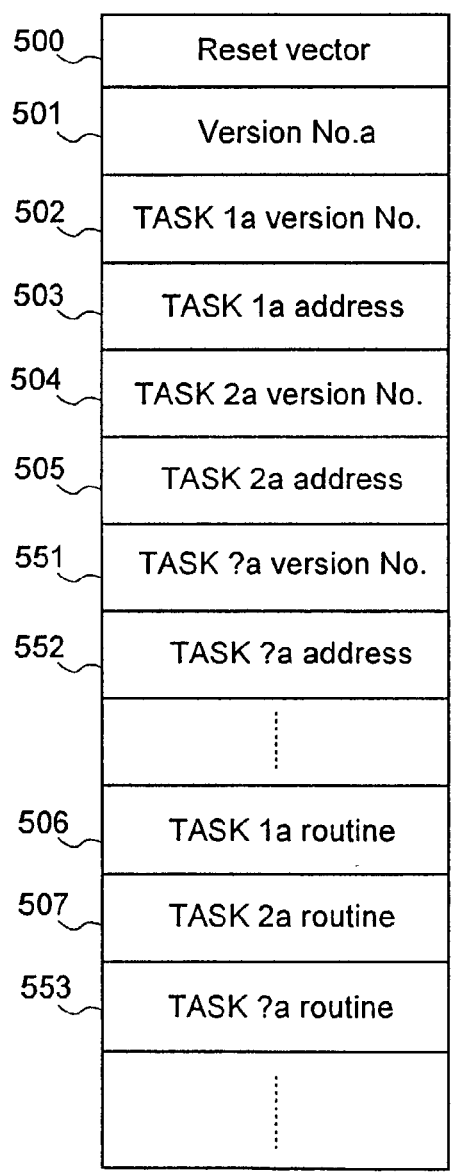
FIGS. 10(a) and 10(b) are diagrams which show the contents of information stored in the ROM and EPROM of FIG. 1, respectively, in yet another embodiment of a microcomputer control system according to the present invention.
Figure 10B:
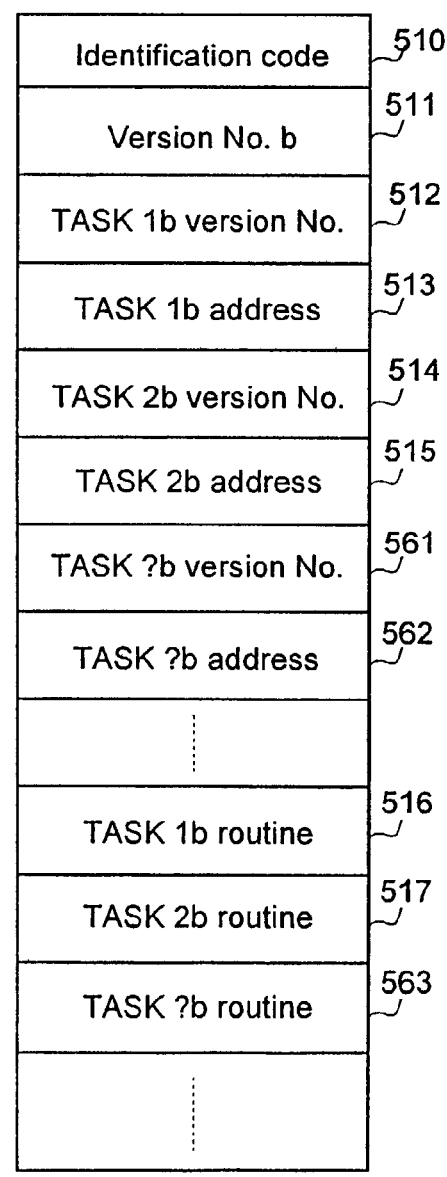

FIGS. 10(a) and 10(b) illustrated an embodiment to which storage areas 551, 552, 553, 561, 562, and 563 are added to the embodiment of FIGS. 5(a) and 5(b).

FIG. 10(a) shows the contents of information stored in the ROM 2 within the one-chip microcomputer 6 in yet another embodiment of a microcomputer control system according to the present invention, and FIG. 10(b) shows the contents of information stored in the external EPROM 5 in the same microcomputer control system. The hardware configuration of this embodiment is also the same as that shown in FIG. 1.

In FIG. 10(a), in the ROM 2, a TASK?a address is stored in storage area 552 and a TASK?a routine corresponding to the TASK?a address is stored in storage area 553. A version number corresponding to the TASK?a routine is stored in storage area 551, which is allocated immediately before storage area 552 in which the TASK?a address is stored.

In FIG. 10(b), in the EPROM 5, a TASK?b address is stored in storage area 562 and a TASK?b routine corresponding to the TASK?b address is stored in storage area 563. A version number corresponding to the TASK?b routine is stored in storage area 561, which is allocated immediately before storage area 562 in which the TASK?b address is stored.

The TASK?a routine is a task not having processing substance and the TASK?b routine is a task having processing substance. When the ROM 2 is fabricated, the system is configured so as not to run into trouble depending on the existence or absence of the TASK?a routine, but if the TASK?b routine of the ROM 2 is added to the system, the TASK?b routine will be newly executed.

Figure 11:
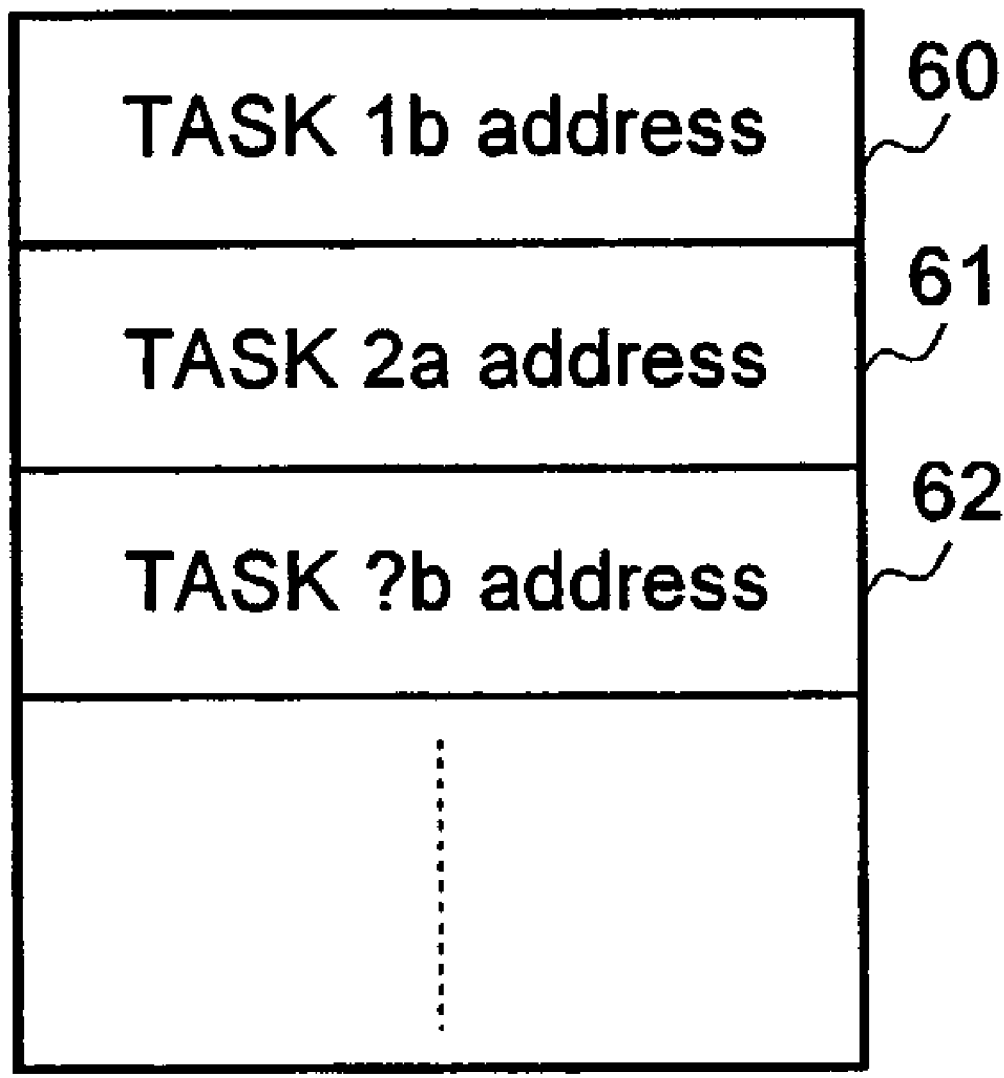
FIG. 11 is a diagram which shows a concrete example of the contents of information stored in the RAM of FIG. 1 in another embodiment of a microcomputer control system according to the present invention.

As described above, if the TASK?b routine is added, an address is registered in the RAM 3 as shown in FIG. 11. That is, storage area 62 is added to the embodiment of 6 and the TASK?b address is registered in the storage area 62.

Of course, if it is unnecessary to newly add processing, the TASK?b routine might be registered as a task not having processing substance, or the TASK?b version number might be set to an old version number (e.g., 0) to register the TASK?a routine. Alternatively, an address (e.g., address 0) which is impossible in the system configuration might be set as a TASK?b address. The setting of an address which is impossible in the system configuration as the TASK?b address, although the legality of a task address must be judged each time the task is used, poses no problem in terms of system configuration because, if a set address is e.g., address 0, it can be easily determined whether a set address is 0 or not.

In the embodiment of FIGS. 10(*a*) and 10(*b*), it would be more effective in terms of system configuration if each of the storage areas 551 and 561 added to the embodiment of FIG. 5 has a fixed address, which is a fixed absolute value of address in an absolute address space. However, the embodiment of the present invention is not limited to only fixed addresses.

The techniques in FIGS. 8(*a*) to 11 enable processing to be added by the EPROM 5 even after fabrication of the ROM 2, contributing to addressing situations unexpected during fabrication of the ROM 2.

Figure 12A:
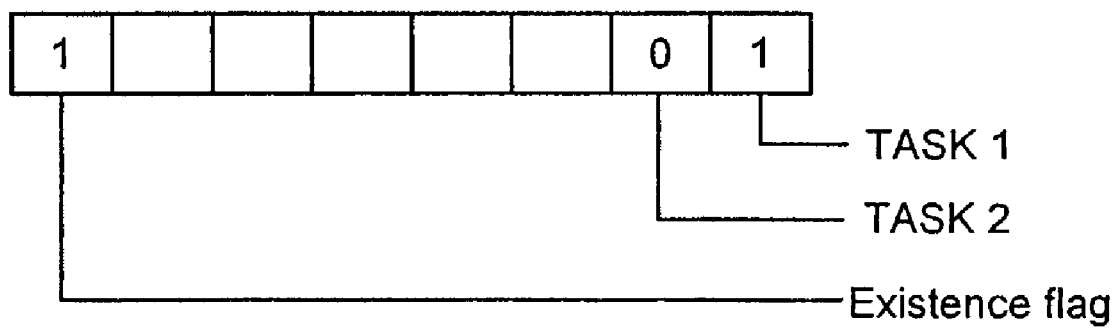
FIGS. 12(a) and 12(b) are diagrams which show a concrete example of the contents of information stored in the RAM of FIG. 1 in another embodiment of a microcomputer control system according to the present invention.
Figure 12B:
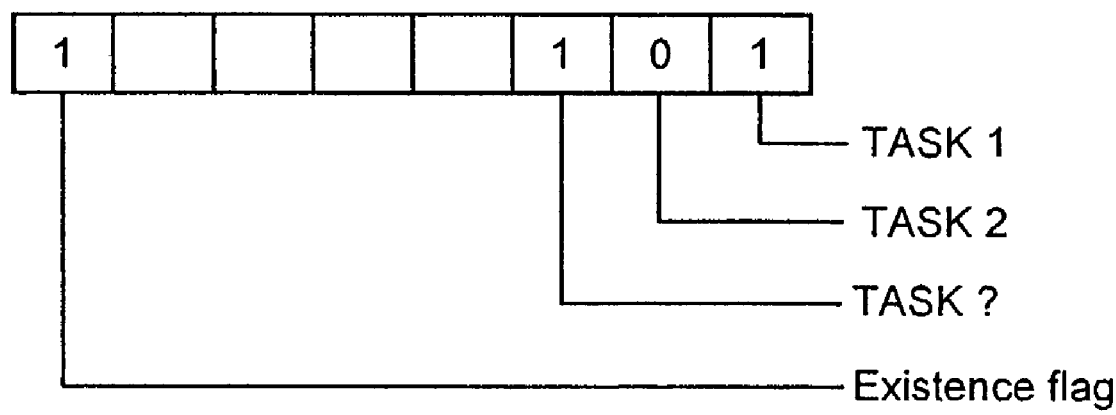

FIGS. 12(*a*) and 12(*b*) show a method of registering to the RAM 3 which is different from that shown in FIGS. 4, 6, 9, and 11. A task registration table (8 bits in 'the case of this embodiment) is provided to provide a correspondence between tasks and bits. Numeral 0 denotes tasks stored in the internal ROM 2 and 1 denotes tasks stored in the external EPROM 5. The most significant bit (bit 7) is a bit to indicate the existence of the external EPROM 5; numeral 0 denotes that no external EPROM 5 exists, and 1 denotes that the external EPROM 5 exists.

FIG. 12(*a*) gives information equivalent to that in FIG. 6. That is, since a bit (the least significant bit 0) corresponding to TASK1is 1, TASK1b stored in the external EPROM 5 is used, and since a bit (bit 1) corresponding to TASK2is 0, TASK2a stored in the internal ROM 2 is used.

Similarly, FIG. 12(*b*) gives information equivalent to that in FIG. 11. To FIG. 12(*a*) is added a bit (bit 2) corresponding to TASK? added to FIG. 6. That is, since a bit (bit 2) corresponding to TASK? Added to FIG. 6 is 1, TASK?b stored in the external EPROM 5 is used.

It goes without saying that if all' the bits of corresponding tasks are 1 in FIGS. 12(*a*) and 12(*b*), the information therein will be equivalent to that in FIGS. 4 and 9.

The embodiment of FIGS. 12(*a*) and 12(*b*) is more advantageous than those of FIGS. 4, 6, 9, and 11, in that smaller storage areas occupy the internal RAM 3.

Figure 13:
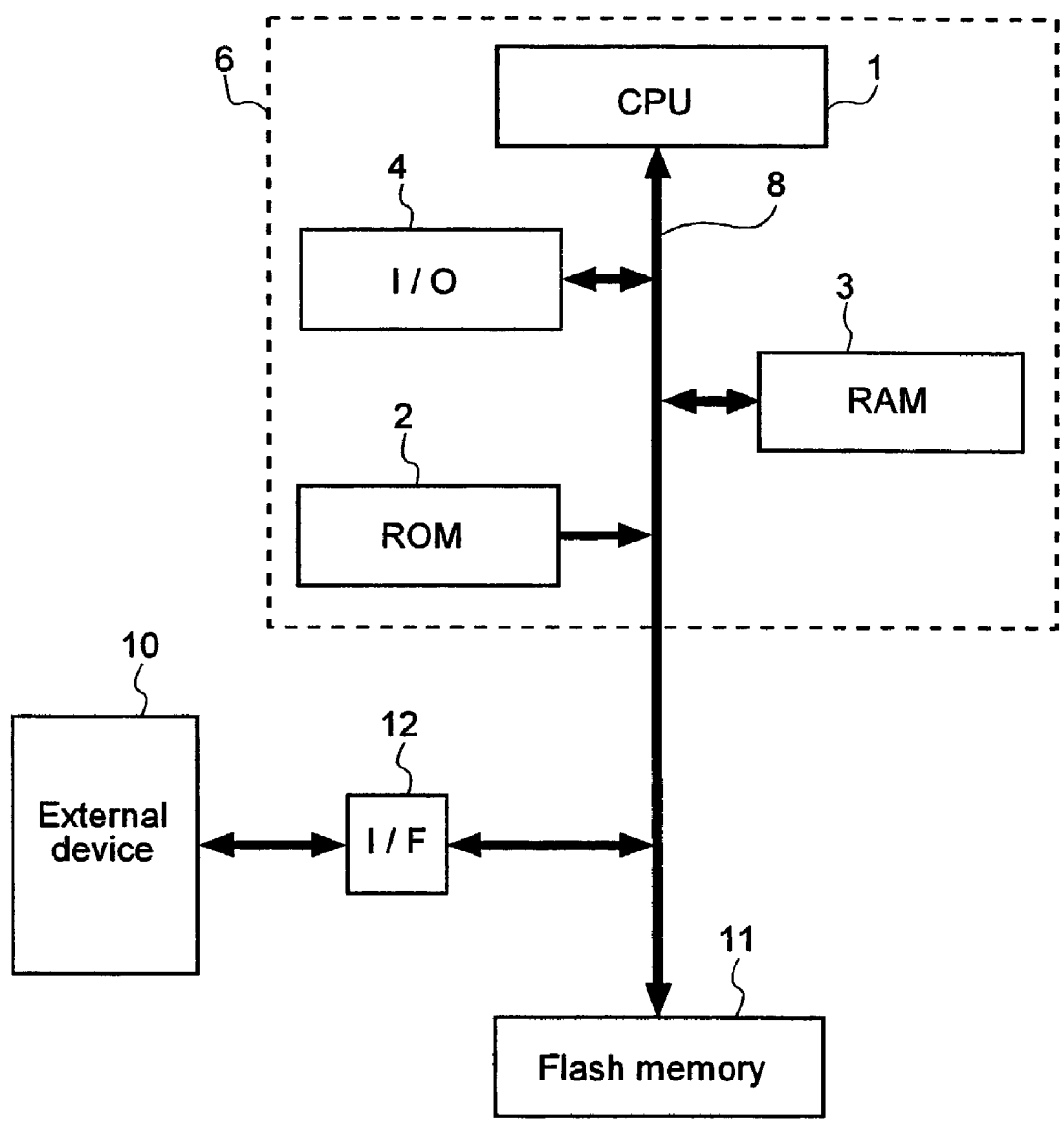
FIG. 13 is a block diagram showing another embodiment of the present invention, with an external device 10 connected to the embodiment of FIG. 1.

FIG. 13 is a block diagram showing another embodiment of the present invention, in which an external device 10 is connected to the embodiment of FIG. 1. The same components as those of FIG. 1 are assigned the same numbers. Address buses and control buses are omitted. In FIG. 1, an EPROM is used, while in FIG. 13, an electrically erasable flash memory 11 is used.

Information from the external device 10 is transferred to the data bus 8 of the one-chip microcomputer 6 via an interface 12 and stored in the flash memory 11.

Figure 14:
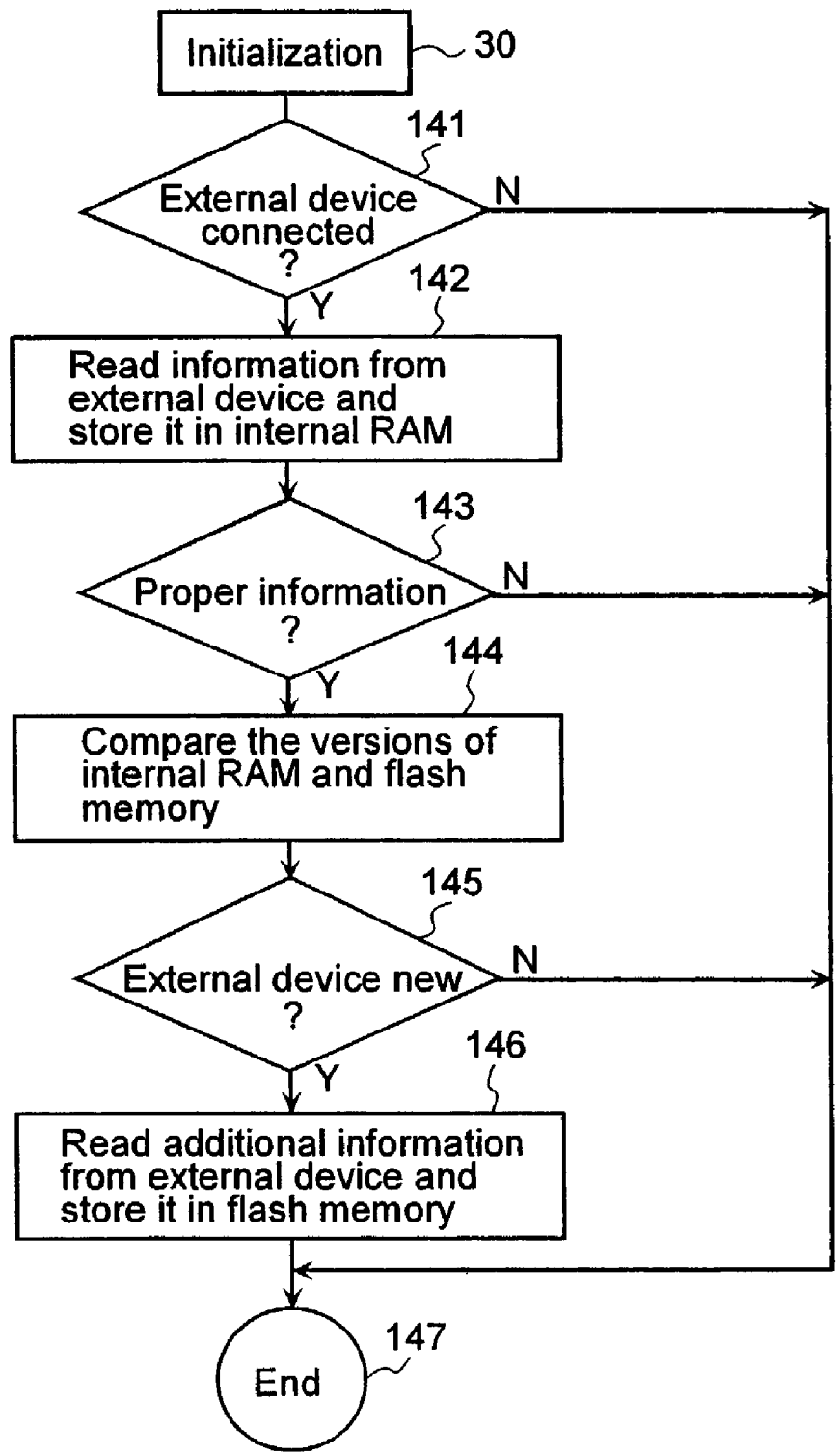
FIG. 14 is a flowchart showing the process of storing information to a flash memory 11.

FIG. 14 shows the process of storing information to the flash memory 11. The same processing contents as those of the flowchart of FIG. 3 are assigned the same reference numerals.

A description will be made of the processing which is different from the processing contents in FIG. 3.

(Step 141) Confirm the connection of an external device 10. With an external device which operates to read an information recording medium, such as a CD-ROM, when an information recording medium is not mounted in the device, it is judged that no. external device is connected, because information cannot be read.

(Step 142) Read information (identification information and version information) from the external device 10 and store it in the internal RAM 3. If information (identification information and version information) is not stored in the flash memory 11, store it directly in the flash memory 11 and go to step 146.

(Step 143) Judge whether the information stored in the internal RAM 3 is proper information (identification information). As proper information, for example, a copyright indication recorded in a volume descriptor of CD-ROM can be used. For other than proper information, go to step 147, and for proper information, compare version information (version number) stored in the internal RAM 3 and version information (version number) stored in the flash memory 11 (step 144).

As a result of the comparison performed in step 142, if the version information stored in the internal RAM 3 is newer, go to step 146, and if the version information stored in the flash memory 11 is newer, go to step 147 (step 146).

(Step 146) Read information (identification information and version information) from the internal RAM 3 and store it in the flash memory 11, then additionally read a processing program (task) having a changed version from the external device 10 and additionally store it in the flash memory 11.

If the information (identification information and version information) was, in step 142, stored directly in the flash memory 11 because it had not been stored in the flash memory 11, additionally read a processing program (task) having a changed version from the external device 10 and additionally store it in the flash memory 11.

(Step 147) Terminate the processing. After this, according to the same processing procedure (replace the EPROM in FIG. 3 by the flash memory) as that of FIG. 3, register a task address of the external flash memory 11 or a task address of the internal ROM 2 in the internal RAM 3.

In this embodiment, as an information recording medium, there can be used pressed CD-ROM disks, DVD-ROM disks, write-once CD-R disks, DVD-R disks, erasable CD-RW disks, and DVD-RAM disks, and the use of these media would make additional operations on version changes simpler than the use of an EPROM. Although this embodiment assumes, as an external device, the use of an information reproducing device that reads information from an information recording medium such as a CD-ROM, it is apparent that the use of devices for receiving and reproducing information transferred by broadcasting or communications would not depart from the scope of the present invention.

In the embodiment of FIG. 13, the system can be built in a manner that stores the control program or data only in the flash memory 11 without storing version information and the control program or data in the internal ROM 2.

In this case, the relationship between the internal ROM 2 and EPROM 5 in FIG. 3 can be considered the same as that between the flash memory 11 and external device 10. Accordingly, the system would effectively use the control program or data stored in the flash memory 11.

Figure 15:
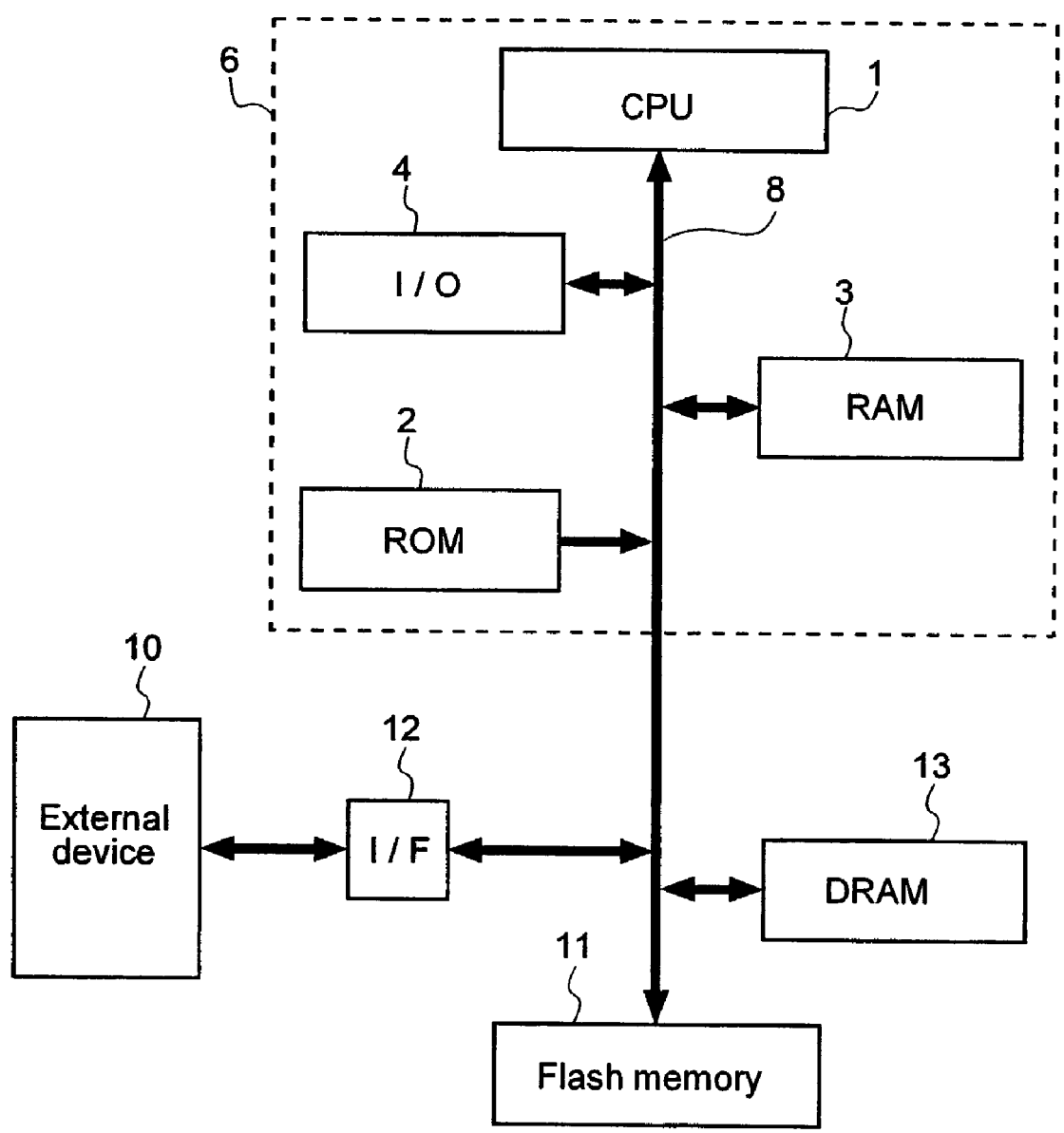
FIG. 15 is a block diagram showing an embodiment with a DRAM 13 appended to the embodiment of FIG. 13.

FIG. 15 is a block diagram showing an embodiment in which DRAM 13 is appended to the embodiment of FIG. 13.

In the embodiment of FIG. 15, the control program or data stored in a DRAM 13, moved from a flash memory 11, is used. In this embodiment, the control program or data stored in the flash memory 11 is an encrypted control program or data, while a decrypted control program or data is stored in the DRAM 13.

When version information is also encrypted, it is decrypted only when it must be used for comparison, to judge whether to store it in the flash memory 11.

In the embodiment of FIG. 15, after comparison of version information, the control program or data with the most recent version is stored in the flash memory 11 in an encrypted form.

Figure 16:
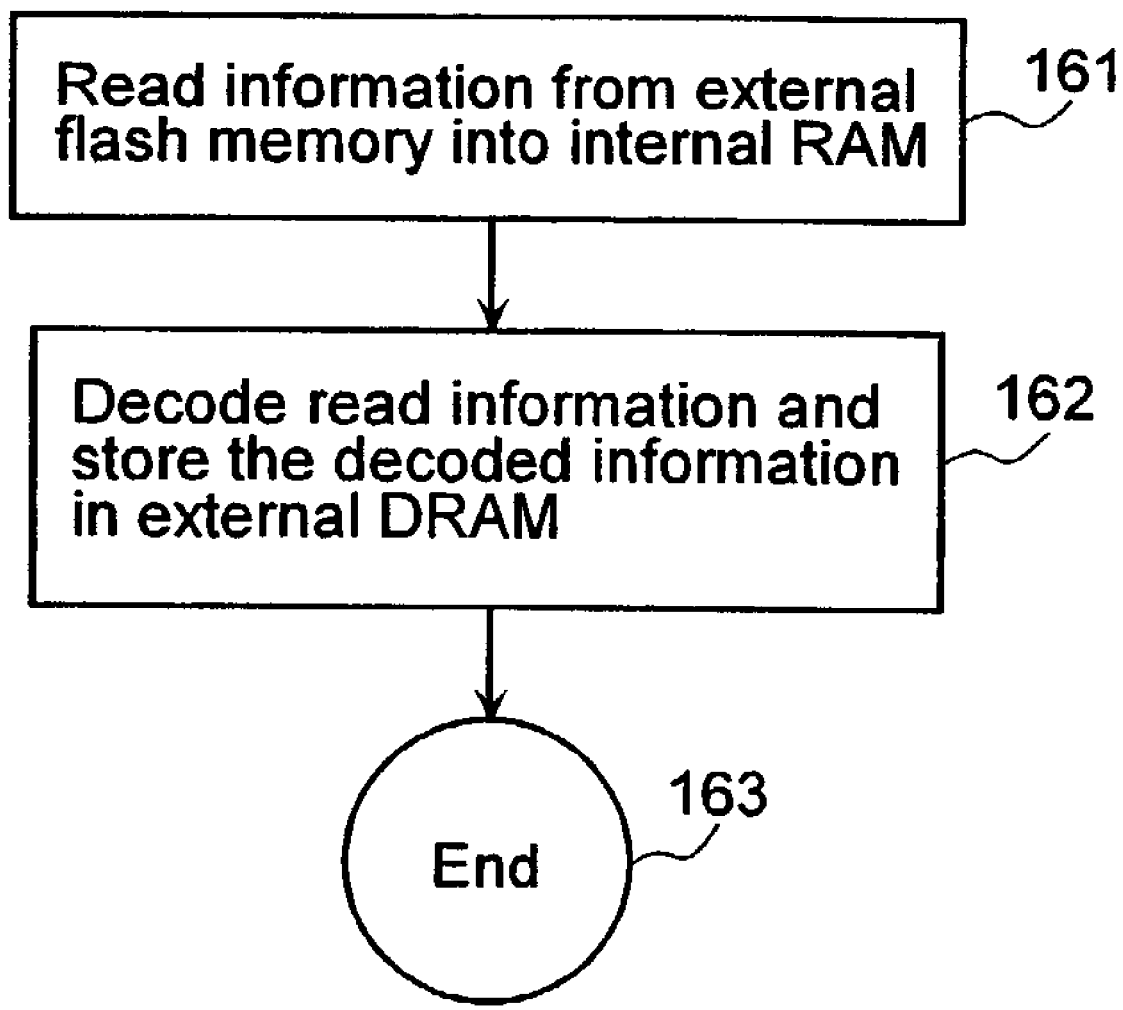
FIG. 16 is a flowchart showing the procedure of processing information in the embodiment of FIG. 15.

A flow of actual processing will be described with reference to the flowchart of FIG. 16.

(Step 161) Read encrypted information (identification information, version information, control program, data, etc.) stored in the external flash memory 11 into the internal RAM 3.

(Step 162) Decrypt the read encrypted information and store it in the external DRAM 13.

(Step 163) Terminate the processing. After this, according to the same processing procedure (replace the EPROM in FIG. 3 by the DRAM) as that of FIG. 3, register a task address of the external DRAM 13 or a task address of the internal ROM 2 in the internal RAM 3.

Although the amount of data read in a single read from the flash memory 11 in step 161 is limited by the buffer capacity of the internal RAM 3, if an encryption operation can be completed within the buffer capacity, the above processing can be successfully performed by repeating steps 161 and 162 a certain number of times.

The use of encrypted information prevents the contents of the flash memory 11 from leaking to the outside, and furthermore, the decrypted information stored in the DRAM 13 is lost at power off because of a refresh operation specific to the DRAM. A processing program for decryption is stored in the internal ROM 2 so that it cannot be easily read from the outside, providing security for the system. Each, time the power is turned on, the processing of FIG. 16 is necessary.

In the embodiment of FIG. 15, the system can be built in a manner such that the control program or data is stored only in the DRAM 13 without storing version information and the control program or data in the internal ROM 2.

In this case, the relationship between the internal ROM 2 and EPROM 5 in FIG. 3 can be considered the same as that between the DRAM 13 and external device 10. Accordingly, the system would effectively use the control program or data stored in the DRAM 13.

For identical version information (where the control program or data is by nature unchanged), its contents can be made different depending on revision information (revision number). Table 1 is an embodiment showing a concrete example of this.

TABLE 1

| Revision number | Contents |
|---|---|
| 1 | Japanese |
| 2 | English |
| 3 | French |
| 4 | German |
| 5 | Chinese |

Table 1 shows an embodiment in which the languages used differ depending on the revision numbers.

All data corresponding to the revision numbers is provided in the EPROM 5, flash memory 11, or DRAM 13; and, when the version number is the same and only the revision number is different, only the revision number of the control program or data stored in the EPROM 5, flash memory 11, or DRAM 13 has to be changed.

However, an algorithm for changing the language to be used, depending on the revision number, must be incorporated in the control program.

Although Table 1 uses revision numbers to identify languages, the revision numbers can also be used to identify countries (Japan, the United States, Chinese, etc.) to use the system, functions (function A, function A+B, etc.) and users (for company A use, for company B use, etc.).

When the above embodiments are used by users for their individual uses, with the microcomputer 6 standardized (programs and data stored in the ROM 2 are standardized), the embodiments can be customized for each user by the external EPROM 5, flash memory 11, or DRAM 13. In this case, as shown in FIGS. 5(a) and 5(b) and FIGS. 10(a) and 10(b), only tasks to be customized might be installed in the EPROM 5, flash memory 11, or DRAM 13. Alternatively, as shown in FIGS. 7(a) and 7(b), only subroutines to be customized might be installed, in the EPROM 5, flash memory 11, or DRAM 13.

In the above embodiments, although a description has been made of the updating of processing, programs (tasks and subroutines) in the ROM 2 and external EPROM 5 within the one-chip microcomputer 6, it is apparent that the updating of data stored in the ROM 2 can be supported by the EPRON 5, flash memory 1, or DRAM 13.

Furthermore, in the above embodiments, although a non-erasable mask ROM has been used as a, ROM 2, a memory such as an erasable EPROM and a flash memory might also be used, and although an erasable EPROM memory, flash memory 11, or DRAM 13 has been used as an external memory, a non-erasable mask ROM might also be used.

In the above embodiments, although the addresses of programs (tasks and subroutines) to be executed have been registered in the RAM 2 of the one-chip microcomputer 6, the programs (tasks and subroutines) themselves to be executed, as well as the addresses, could alternatively be registered as items of information to be registered. Also, in a RAM, flash memory, DRAM, etc., the addresses of programs (tasks and subroutines) and the programs (tasks and subroutines) themselves to be executed can be registered. Such a RAM, flash memory, DRAM, etc., is connected external of the one-chip microcomputer 6.

Although version information is used in the foregoing description of the embodiments according to the present invention, programs, data information, and the like can be used for comparison without being confined to version information. For example, there can be used comment statements, copyright indication, program size, data size, program starting address, data starting address, and other information within programs or data.

As has been described below, according to the present invention, since a version number in a ROM within a one-chip microcomputer is compared with a version number in an external EPROM, flash memory, or DRAM, programs (tasks and subroutines) of a new version can always be executed and update data of a new version can be used. Also, the programs can be customized for each user.

Also, since only programs or data to be updated or modified is added to the outside, the programs or data to be added can be brought into a minimum size.

Since information in programs or data as well as version information can be used for comparison, version information can be made useless.

What is claimed is:

1. A microcomputer control system, comprising:
a memory unit for storing an incorporated program which controls the microcomputer control system when executed,
wherein the incorporated program can be modified based on a program provided from outside of the microcomputer control system; and
a control unit for executing each task of the incorporated program as an execution element,
wherein each task of the incorporated program and each corresponding task of the program provided from outside the microcomputer control system are compared, and
wherein each task of the incorporated program is replaced with the corresponding task of the program provided from outside the microcomputer control system, if the task of the program provided from outside the microcomputer control system is newer.

2. A microcomputer control system, comprising:
a memory unit for storing an incorporated program which controls the microcomputer control system when executed,
wherein the incorporated program can be modified based on a program provided from outside the microcomputer control system; and
a control unit for executing each subroutine of the incorporated program as an execution element,
wherein each subroutine of the incorporated program and each corresponding subroutine of the program provided from outside the microcomputer control system are compared, and
wherein each subroutine of the incorporated program is replaced with the corresponding subroutine of the program provided from outside the microcomputer control system, if the subroutine of the program provided from outside the incorporated control system is newer.

3. A microcomputer control system according to claim 1, wherein if a task which having no processing substance is included in the tasks of the incorporated program, then the task is replaced with a task of the program provided from outside the microcomputer control system.

4. A microcomputer control system according to claim 1, wherein the program provided from outside the microcomputer control system is provided by a recording medium.

5. A microcomputer control system according to claim 1, wherein the program provided from outside the microcomputer control system is transferred by broadcasting or communications.

6. A microcomputer control system according to claim 1, wherein the task of the program provided from outside the microcomputer control system is encrypted.

7. A microcomputer control system according to claim 1, wherein replacement of a task is customized for each user.

* * * * *